US008666167B2

(12) United States Patent
Albouyeh et al.

(10) Patent No.: US 8,666,167 B2
(45) Date of Patent: Mar. 4, 2014

(54) POLICY-BASED IMAGE MANAGEMENT

(75) Inventors: Shadi E. Albouyeh, Raleigh, NC (US);
Yen-Kwang Lin, Raleigh, NC (US);
Robert C. Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/176,143

(22) Filed: Jul. 5, 2011

(65) Prior Publication Data
US 2013/0011068 A1    Jan. 10, 2013

(51) Int. Cl.
*G06K 9/46* (2006.01)

(52) U.S. Cl.
USPC ........................................................ 382/190

(58) Field of Classification Search
None
See application file for complete search history.

(56) References Cited

U.S. PATENT DOCUMENTS

| | | | |
|---|---|---|---|
| 6,574,348 B1 | 6/2003 | Venkatesan et al. | |
| 6,965,917 B1 * | 11/2005 | Aloni et al. | 709/206 |
| 2001/0000265 A1 | 4/2001 | Schreiber et al. | |
| 2003/0051039 A1 * | 3/2003 | Brown et al. | 709/229 |
| 2005/0283609 A1 | 12/2005 | Langford | |
| 2006/0176516 A1 | 8/2006 | Rothschild | |
| 2007/0239683 A1 | 10/2007 | Gallagher | |
| 2011/0002542 A1 * | 1/2011 | Adcock | 382/181 |

OTHER PUBLICATIONS

Ozkan, "A Graph Based approach for Finding People in News", Thesis submission to Bilkent University, Ankara, Turkey, Jul. 2007, pp. 1-89.
Jian et al., "Trademark Image Retrieval Using Wavelet-based Shape Features", International Symposium on Intelligent Information Technology Application Workshops, 2008. IITAW '08, Dec. 21-22, 2008 , Shanghai, pp. 496-500.
Rusinol et al., "Efficient Logo Retrieval Through Hashing Shape Context Descriptors", DAS '10 Proceedings of the 9th IAPR International Workshop on Document Analysis Systems, Jun. 9-11, 2010, Boston MA, pp. 1-8.
Fan et al., "Selection and Fusion of Facial Features for Face Recognition", Expert Systems with Applications: An International Journal archive, vol. 36 Issue 3, Apr. 2009, pp. 1-20.

* cited by examiner

*Primary Examiner* — Stephen R Koziol
*Assistant Examiner* — Amandeep Saini
(74) *Attorney, Agent, or Firm* — Yee & Associates, P.C.; Yeen Tham

(57) ABSTRACT

The different illustrative embodiments provide a method, computer program product, and apparatus for managing an image. A determination is made whether an object is present in a subset of a plurality of images using an identification of the object. A determination is made whether the object is permitted to be present in the subset of the plurality of images using the policy for the user associated with the object responsive to a determination that the object is present in the subset of the plurality of images using a policy for a user associated with the object. A removal action of the object is performed on the subset of the plurality of images responsive to an absence of a determination that the object is permitted to be present in the subset of the plurality of images using the policy.

16 Claims, 8 Drawing Sheets

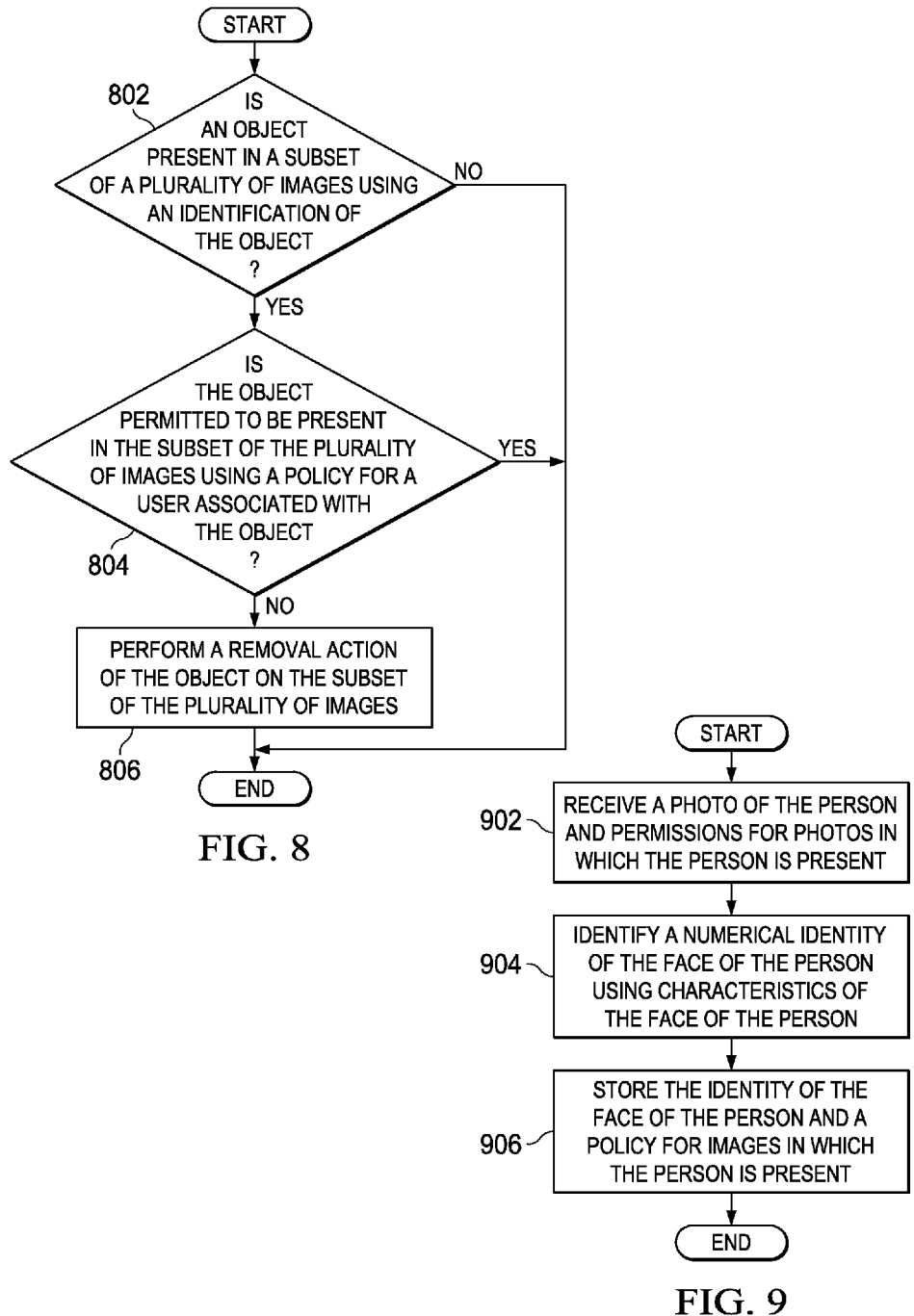

POLICY-BASED IMAGE MANAGEMENT

BACKGROUND

1. Field

The disclosure relates generally to an improved data processing system and more specifically to image management in an improved data processing system. More specifically, the disclosure relates to a method, computer program product, and apparatus for managing an image. Even more specifically, the disclosure relates to policy-based image management in an improved data processing system.

2. Description of the Related Art

Images or photos stored in computer systems commonly contain one or more objects. For example, an image may contain a person, more than one person, a trademark, a vehicle, or another suitable object. Frequently, images containing one or more objects are stored such that the images may be viewed by one or more users of the computer system.

For example, the images may be stored on a web server and/or a social network. In such illustrative examples, the images may be viewed by the user that stored the images and/or other users. In an illustrative example in which the images are stored in a social network, users which have been granted permission by the user that stored the image in the social network may view the images and the objects that are present in the images. For example, user John Doe may upload a photograph of a car. User Jane Doe is friends with John Doe in the social network. Thus, Jane Doe may view the photograph of the car.

Users frequently capture and store images of people other than themselves. For example, a user may capture an image of the friends of the user, a celebrity encountered by the user, the family of the user, or an unknown person using a camera. The user may then store the captured images on a web server or in a social network. Other users may then receive and view the captured images using a computer network, such as the Internet.

In some examples, users store images containing copyrighted materials or trademarks. Copyrighted materials are works that have a set of exclusive rights associated with the work that are granted to the author or creator of the work. The exclusive rights may include the right to copy, distribute, and adapt the work. For example, the text of a novel may be a copyrighted material. The images may also be a copyrighted material when the images are generated by the user. For example, the images may be generated by using a digital camera. A trademark is a logo, a graphic, a collection of text, or another suitable item that represents an entity, a product sold by the entity, or a service offered by the entity. For example, Tivoli® is a registered trademark of International Business Machines Corp. in Armonk, N.Y., that represents the name of integrated service management software offered by International Business Machines Corp. The user storing the images may or may not have the permission of the copyright owner or trademark owner to store the images.

The users that receive the images may show the images to additional people, download the images, store the images such that undesired users may access the images, and/or modify the images in an undesired way. For example, a user may generate a copy of an image of a user from a social network that only particular users may access and store the copy of the image in the social network such that undesired users may access the copy of the image containing the friends of the user, celebrity encountered by the user, or the unknown person.

SUMMARY

The different illustrative embodiments provide a method, computer program product, and apparatus for managing an image. A determination is made whether an object is present in a subset of a plurality of images using an identification of the object. A determination is made whether the object is permitted to be present in the subset of the plurality of images using the policy for the user associated with the object responsive to a determination that the object is present in the subset of the plurality of images using a policy for a user associated with the object. A removal action of the object is performed on the subset of the plurality of images responsive to an absence of a determination that the object is permitted to be present in the subset of the plurality of images using the policy.

BRIEF DESCRIPTION OF THE SEVERAL VIEWS OF THE DRAWINGS

FIG. 8 depicts an illustration of a second flowchart of a process for managing an image in accordance with an illustrative embodiment;

FIG. 9 depicts an illustration of a flowchart of a process for receiving an identification in accordance with an illustrative embodiment.

DETAILED DESCRIPTION

Figure 1:
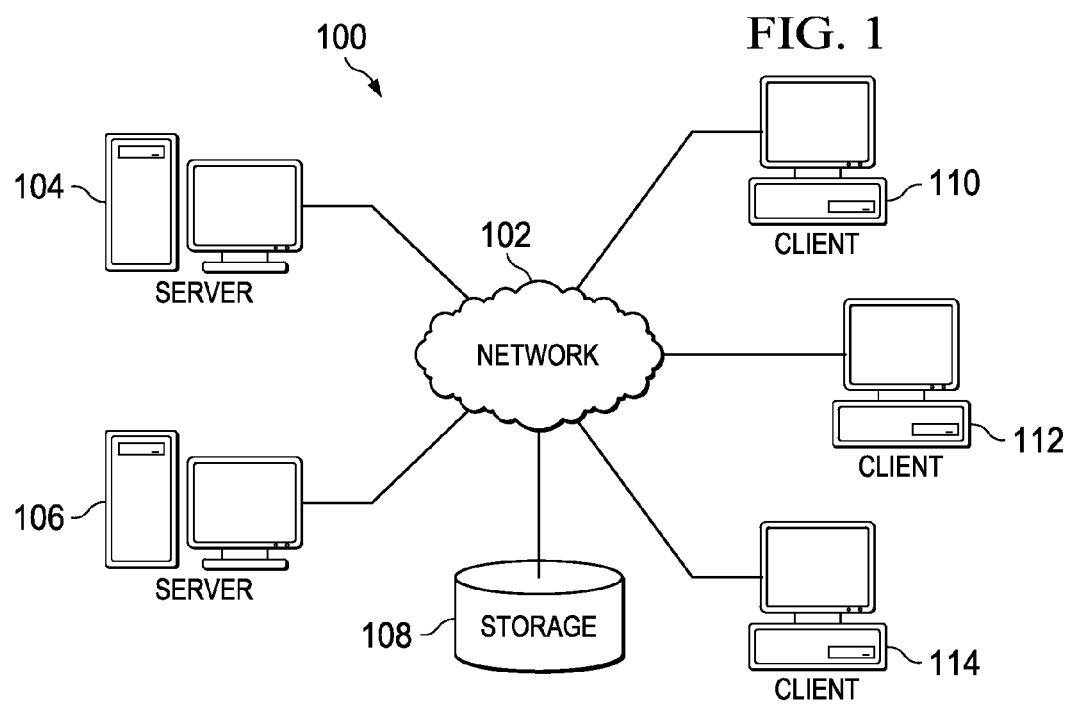
FIG. 1 depicts an illustration of a diagram of a data processing environment in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Server computer 104 and/or server computer 106 store image files or have access to image files stored in storage unit 108 in these illustrative examples. Client computers 110, 112, and 114 may request image files from server computer 104 and/or server computer 106. Such image files may be made accessible on a website using a web server process running on server computer 104 and/or server computer 106. Alternatively, server computer 104 and/or server computer 106 may make the image files accessible to client computers 110, 112, and 114 using a social network server process.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 may also be implemented as a number of different types of networks, such as, for example, an intranet, a local area network (LAN), or a wide area network (WAN). FIG. 1 is intended as an example, and not as an architectural limitation for the different illustrative embodiments.

Figure 2:
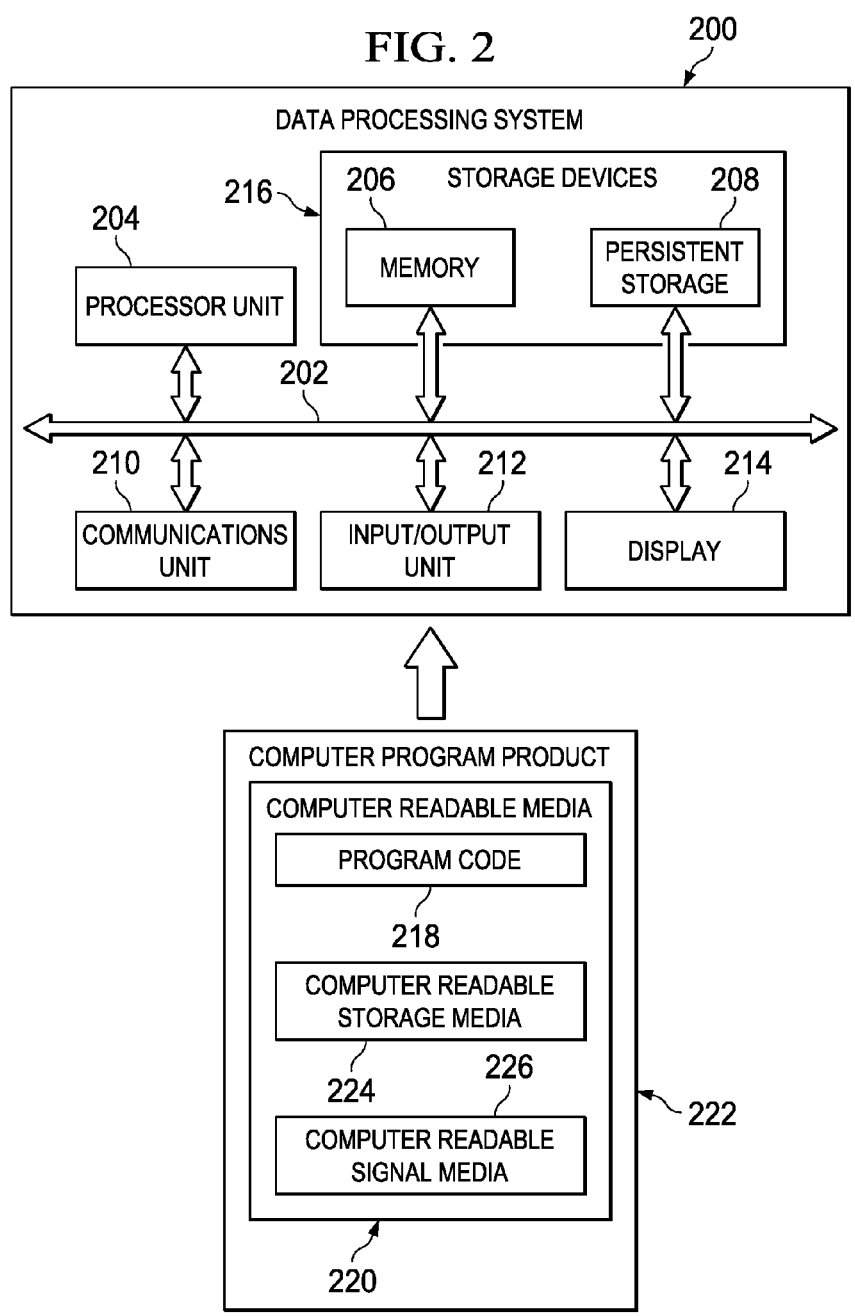
FIG. 2 depicts an illustration of a data processing system in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example of a data processing system that can be used to implement server computers and client computers in network data processing system 100 in FIG. 1.

Processor unit 204 serves to process instructions for software that may be loaded into memory 206. Processor unit 204 may be a number of processors, may be a multi-processor core, or some other type of processor, depending on the particular implementation. A "number", as used herein, with reference to an item, means "one or more items". Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and processed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage media.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components, and/or may be comprised entirely of organic components, excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The different illustrative embodiments recognize and take into account a number of different considerations. For example, the different illustrative embodiments recognize that a user may desire to prohibit the publication of images in which the user is present without the authorization of the user. In other words, the user may desire to maintain privacy by not having images in which the user is present published without the authorization of the user. An individual present in an image may be identified using an algorithm. For example, facial recognition techniques may be used to identify the individual present in the image. The different illustrative embodiments recognize that a user may provide an image in which the user is present. The face of the user in the image may then be used to identify the user in other images using facial recognition.

The different illustrative embodiments also recognize and take into account that the images in which an individual is present may be captured and/or stored and/or shared without the permission of the individual. In some illustrative examples, the individual present in the image may be in a location or with another person considered undesirable to the individual. The different illustrative embodiments recognize that allowing a particular individual to set a policy on who may store images in which the individual is present and/or which images may be stored prevents other users of the network from viewing images considered undesirable by the individual.

The different illustrative embodiments also recognize and take into account that a removal action of the individual from the image. A removal action is an action that causes and/or leads to the individual no longer being present in the image. For example, the removal action may include the person being removed from the image when the image is located. In one illustrative embodiment, the removal action includes the individual in the image being replaced with other imagery, and the image is stored on the web server, the social network, or other suitable network service. In another illustrative embodiment, the removal action includes the image not being stored. In yet another illustrative embodiment, the removal action includes an administrator for a website or other resource storing the image is notified that the image is being used without the permission of the individual present in the image. Of course, in some illustrative embodiments, more than one removal action may be performed.

Thus, illustrative embodiments provide a method, computer program product, and apparatus for managing an image. A determination is made whether an object is present in a subset of a plurality of images using an identification of the object. A determination is made whether the object is permitted to be present in the subset of the plurality of images using the policy for the user associated with the object responsive to a determination that the object is present in the subset of the plurality of images using a policy for a user associated with the object. A removal action of the object is performed on the subset of the plurality of images responsive to an absence of a determination that the object is permitted to be present in the subset of the plurality of images using the policy.

Figure 3:
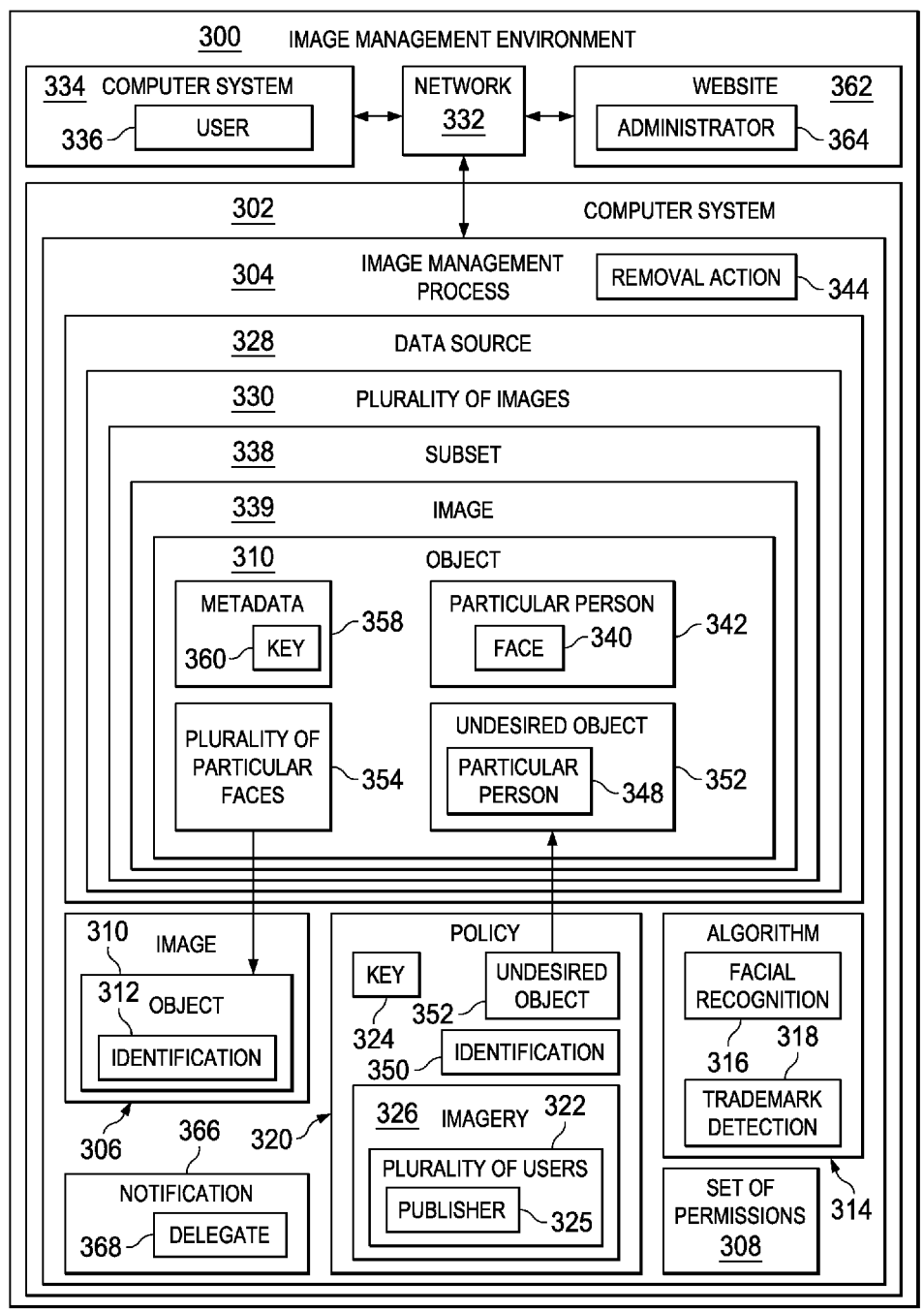
FIG. 3 depicts an illustration of a block diagram of an image management environment in accordance with an illustrative embodiment.

Turning now to FIG. 3, an illustration of a block diagram of an image management environment is depicted in accordance with an illustrative embodiment. Image management environment 300 is an example of an environment in which illustrative embodiments may be implemented.

Image management environment 300 contains computer system 302. Computer system 302 is an example implementation of data processing system 200 in FIG. 2. In these illustrative examples, computer system 302 consists of a single computer system. However, in other illustrative embodiments, multiple computer systems may be used to implement the features and processes of computer system 302.

Computer system 302 runs image management process 304. Image management process 304 receives image 306, identification 312, and set of permissions 308. Object 310 is present in image 306. Object 310 is something that is visible and can be perceived by a person. Object 310 may appear in an image, such as a photograph. For example, object 310 may be an item, a person, a trademark, or another suitable visible thing. A trademark is a logo, a graphic, a collection of text, or another suitable item that represents an entity, a product sold by the entity, or a service offered by the entity. For example, Tivoli is a registered trademark of International Business Machines Corp. in Armonk, N.Y., that represents the name of integrated service management software offered by International Business Machines Corp. Object 310 is present in image 306 when at least a portion of object 310 appears in image 306.

Image 306 is received with identification 312 of object 310. Identification 312 is an indication of which object in image 306 is to be identified as object 310. For example, identification 312 may be a user input in which an area of image 306 is selected. The area may contain a face of the user providing the user input. In another illustrative embodiment, identification 312 may not be present. For example, image 306 may contain only one human face. Identification 312 is set as the human face in image 306.

Image management process 304 processes image 306 using algorithm 314. Algorithm 314 is a process that identifies one or more objects in an image. Algorithm 314 is facial recognition 316 in these illustrative examples. For example, facial recognition 316 may be FaceIt by L–1 Identity Solutions, Inc. in Stamford, Conn. In one illustrative embodiment, facial recognition 316 is performed by identifying a collection of landmarks on a human face to generate a numerical code called a faceprint. For example, the collection of landmarks may include distance between the eyes, width of the nose, depth of the eye sockets, the shape of the cheekbones, and the length of the jaw line. In other illustrative examples, algorithm 314 is trademark detection 318. Trademark detection 318 is a process that identifies trademarked logos, graphics, and/or text in image 306. While humans are recognized using facial recognition 316 in these illustrative embodiments, other illustrative embodiments may include algorithm 314 that uses the face and/or other visible features of the person to identify the person.

Once image management process 304 identifies object 310 in image 306 using identification 312, image management process 304 uses set of permissions 308 to generate policy 320. As used herein, a "set" when used with reference to items means one or more items. For example, set of permissions 308 is one or more permissions. In the illustrative examples, set of permissions 308 is a collection of authorizations and/or restrictions for use of object 310 in images.

For example, set of permissions 308 may include plurality of users 322 that may store images in which object 310 is present. In another illustrative example, set of permissions 308 includes key 324 that is to be associated with an image for the image to be permitted to be stored. Of course, in other illustrative embodiments, set of permissions 308 may include other criteria, such as restrictions on the date the image was captured.

Policy 320 is a data structure in which the results of processing set of permissions 308 are stored. For example, policy 320 may be an entry in a database. Thus, image management process 304 may access policy 320 to identify whether object 310 is permitted to be present in an image that a user requests to store in computer system 302. In these illustrative examples, policy 320 contains identifiers for plurality of users 322 and key 324. Each of plurality of users 322 is permitted to be publisher 325 of imagery 326 in which object 310 is present. In one illustrative embodiment, a user in plurality of users 322 is publisher 325 of imagery 326 when the user attempts to store imagery 326 in which object 310 is present in computer system 302. Additionally, any user that attempts to store imagery 326 in which object 310 is present may store imagery 326 in computer system 302 as long as each image in which object 310 is present contains key 324. For example, key 324 may be stored in metadata associated with the image.

Image management process 304 may access data source 328 to process plurality of images 330. Data source 328 is a collection of data received by computer system 302 but not yet stored in persistent storage, such as persistent storage 208 in FIG. 2. In another illustrative embodiment, however, data source 328 is a collection of data stored in computer system 302. For example, data source 328 may be one or more storage devices, such as storage devices 216 in FIG. 2. In such an illustrative example, plurality of images 330 stored in data source 328 are processed prior to being made accessible to other users. For example, plurality of images 330 in data source 328 are processed prior to making plurality of images 330 available to send to other computer systems using network 332.

In this illustrative embodiment, computer system 334 sends plurality of images 330 to computer system 302 because user 336 desires to make plurality of images 330 viewable to other users in a social network. Image management process 304 receives plurality of images 330 from computer system 334 and stores plurality of images 330 in data source 328. In another illustrative embodiment, plurality of images 330 are already stored in data source 328. In such an illustrative embodiment, plurality of images 330 may be accessible to other users using a web server or a social network. Image management process 304 then processes plurality of images in data source 328.

Image management process 304 then determines whether object 310 is present in subset 338 of plurality of images 330. Subset 338 is one or more images in plurality of images 330. For example, in an illustrative example in which plurality of images 330 may contain about ten images, subset 338 of plurality of images 330 may include about five images in which object 310 is present. In one illustrative embodiment, subset 338 represents a collection of photos that are in a particular folder in data source 328 or associated with a particular user in a social network. In one illustrative embodiment, subset 338 is image 339 in plurality of images 330.

Image management process 304 then determines whether object 310 is present in subset 338 by processing plurality of images 330 with algorithm 314. For example, facial recognition 316 may be used to determine whether object 310 is present in subset 338 when object 310 is face 340 of particular person 342. Particular person 342 is object 310 in this illustrative embodiment. Image management process 304 uses identification 312 of object 310 to determine whether object 310 is present in subset 338. Thus, in this illustrative embodiment, identification 312 represents face 340 of particular person 342.

In other illustrative embodiments, object 310 is a trademark. The trademark is a logo, a graphic, a collection of text, or another suitable item that represents an entity, a product sold by the entity, or a service offered by the entity. For example, the trademark may be a graphical logo representing International Business Machines Corp. In such an illustrative embodiment, image management process 304 uses trademark detection 318 for algorithm 314 to determine whether the trademark is present in subset 338.

Once image management process 304 determines that object 310 is present in subset 338 of plurality of images 330, image management process 304 determines whether object 310 is permitted to be present in subset 338 using policy 320. Policy 320 may contain an indication for image management process 304 to identify the user that stored or is attempting to store subset 338 in data source 328. In the event that the user is not in plurality of users 322 in policy 320, image management process 304 determines that object 310 is not permitted in subset 338 of plurality of images 330. For example, assume policy 320 indicates that only user John Smith may store images in which user Jane Doe is present. Also assume user James Johnson is attempting to store subset 338 of plurality of images 330 in data source 328, and Jane Doe is present in at least one image in subset 338. Image management process 304 determines that subset 338 includes at least one image that is not permitted according to policy 320.

In another illustrative embodiment, policy 320 may contain an indication for image management process 304 to determine whether key 324 is present in metadata 358 associated with image 339 in subset 338 when object 310 is present in image 339. Metadata 358 is data associated with image 339 that describes image 339. For example, metadata 358 may include information about the date that image 339 was generated, a location at which image 339 was generated, the model of the camera used to generate image 339, or other suitable information.

In this illustrative embodiment, image management process 304 determines whether metadata 358 includes key 360 and whether key 360 matches key 324. Key 360 may match key 324 when key 360 is the same as key 324 or when key 324 is part of a digital signature on image 339 that can be verified by key 360 or another suitable technique.

In yet other illustrative embodiments, policy 320 includes identification 350 of undesired object 352. Undesired object 352 is an object with whom object 310 is not permitted to appear in policy 320. For example, undesired object 352 may be particular person 348, and identification 350 may be the face of particular person 348. In other words, policy 320 may indicate that particular person 342 is not permitted to be present in an image with particular person 348. Of course, policy 320 may indicate that object 310 is not permitted to be present in an image with undesired object 352 in illustrative embodiments where object 310 and/or undesired object 352 are other types of objects. For example, object 310 and/or undesired object 352 may be a trademark.

In illustrative embodiments in which policy 320 indicates that particular person 342 is not permitted to be present in an image with particular person 348, image management process 304 determines that object 310 is present in subset 338 when plurality of particular faces 354 are present in subset 338 of plurality of images 330. Plurality of particular faces 354 is a collection of faces that includes face 340 of particular person 342 and the face of particular person 348. In such illustrative embodiments, image management process 304 performs facial recognition 316 to determine whether face 340 of particular person 342 and the face of particular person 348 are present in subset 338. Image management process 304 may use another algorithm 314 in other illustrative embodiments. For example, image management process 304 may use trademark detection 318.

When image management process 304 determines that object 310 is present in subset 338 and that object 310 is not permitted to be present in subset 338 according to policy 320, image management process 304 may perform removal action 344. Removal action 344 is an action that causes and/or leads to the individual no longer being present in the image. In one illustrative embodiment, removal action 344 includes removing subset 338 from plurality of images 330 and/or data source 328. For example, in the event that image management process 304 is a component in a social network service, image management process 304 may delete or hide subset 338 from the social network. In another illustrative embodiment, removal action 344 includes image management process 304 sending a notification to computer system 334 that subset 338 is not permitted because object 310 is not permitted to be present in subset 338. In other illustrative examples, removal action 344 includes subset 338 remaining stored in data source 328 and being made accessible to the web or social network, but image management process 304 modifies image 339 in subset 338 to obscure or remove object 310. For example, image management process 304 may insert a colored shape, graphic, text, or other suitable item over the location of particular person 342 in image 339 such that particular person 342 may no longer be identified in image 339.

In yet another illustrative embodiment, data source 328 is accessible via a web server. In other words, plurality of images 330 are available on website 362. In the event that website 362 is under the control of the same entity as image management process 304, removal action 344 may include image management process 304 removing subset 338 of plurality of images 330 from website 362. In the event that website 362 is not under the control of the same entity as image management process 304, removal action 344 may include image management process 304 sending a notification to administrator 364 of website 362. The notification may be an e-mail, an instant message, a message in a social network, or another suitable communication.

In some illustrative embodiments, image management process 304 generates notification 366. Notification 366 is a communication informing the user associated with identification 312 that image management process 304 determined that object 310 was present in subset 338 of plurality of images 330. For example, notification 366 may be sent to an account associated with particular person 342. Further, in some illustrative embodiments, particular person 342 may be a person that is unable to administer policy 320 for the person. For example, particular person 342 may be a minor or a disabled person. In such an illustrative embodiment, delegate 368 may represent particular person 342 and receive notification 366 on behalf of particular person 342. For example, delegate 368 may be a parent or guardian of particular person 342.

The illustration of computer system 302 in image management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, data source 328 may be accessible to another computer system. In one illustrative embodiment, a web server process and/or a social network server process access data source 328 to provide plurality of images 330 to users requesting plurality of images 330. In other illustrative embodiments, administrator 364 may be identified using WHOIS information from the Internet Corporation for Assigned Names and Numbers (INTERNIC) or another suitable directory service.

Figure 4:
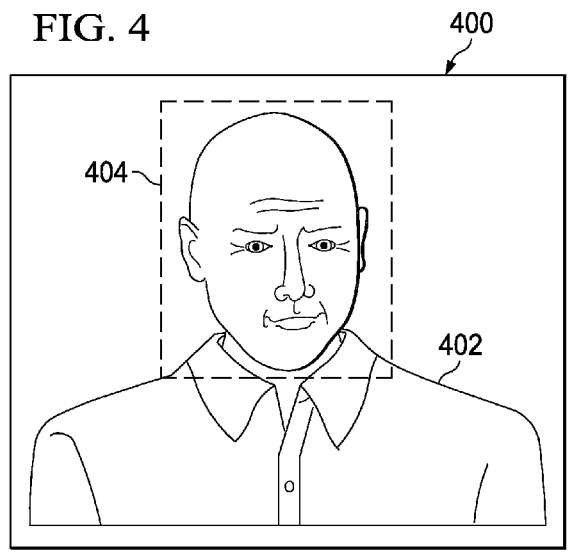
FIG. 4 depicts an illustration of an image for identification in accordance with an illustrative embodiment.

Referring now to FIG. 4, an illustration of an image for identification is depicted in accordance with an illustrative embodiment. Image 400 is an example implementation of image 306 in FIG. 3.

Image 400 is received to identify a person whose face is to be identified in images stored in a data source, such as data source 328 in FIG. 3. Image 400 contains the likeness of person 402. Person 402 is an example of particular person 342 in FIG. 3. In some illustrative embodiments, an image management process, such as image management process 304, determines the location of identification 404 in image 400 automatically using facial recognition algorithms, such as facial recognition 316 in FIG. 3. In other illustrative embodiments, the user designates the area where the face of the user is located in the image, such as with a digitally drawn rectangle. In yet other illustrative embodiments, the image management process uses trademark recognition algorithms to determine the presence and/or location of trademarks in the images. Of course, additional algorithms may be used to identify and/or locate other types of controlled objects. A policy is also generated in response to receiving image 400 that indicates the permissions associated with images in which person 402 is present.

Figure 5:
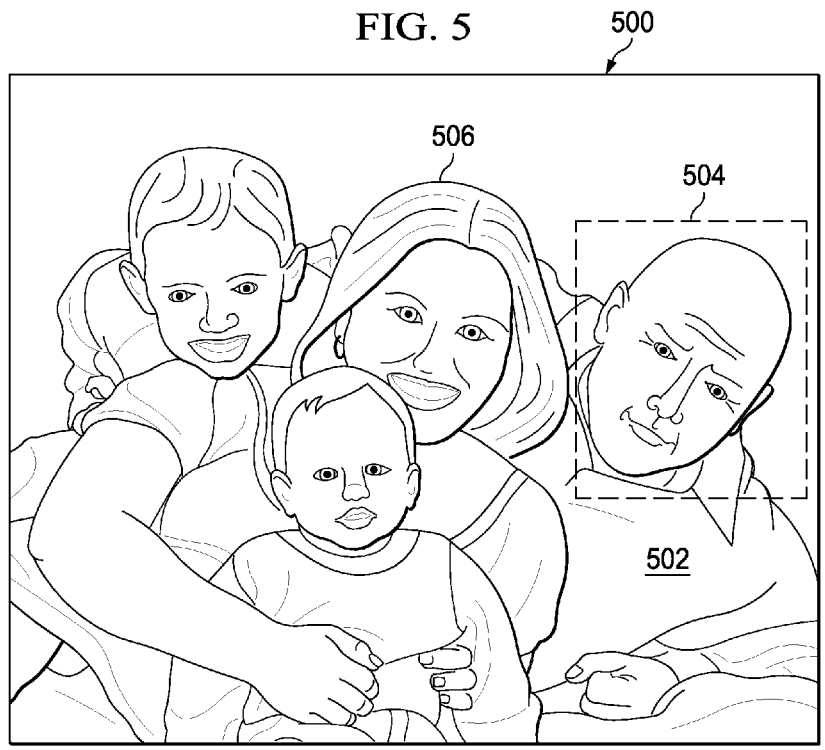
FIG. 5 depicts an illustration of an image that may be stored in a data source in accordance with an illustrative embodiment.

Turning now to FIG. 5, an illustration of an image that may be stored in a data source is depicted in accordance with an illustrative embodiment. Image 500 is an example of image 339 in FIG. 3.

Person 502 is identified in image 500 using facial recognition algorithms, such as facial recognition 316 in FIG. 3. In other words, face 504 of person 502 is identified. Thus, a determination is made that person 502 is present in the image, and the location of person 502 in the image is identified using the location of face 504. In one illustrative embodiment, an image management process, such as image management process 304 in FIG. 3, determines that the user who is attempting to cause image 500 to be stored in the data source is not in a plurality of users, such as plurality of users 322 in FIG. 3, that is permitted to store images in which person 502 is present.

In another illustrative embodiment, a policy for imagery containing person 502, such as policy 320 in FIG. 3, indicates that person 502 and person 506 may not both be present in image 500. Thus, even in the event that the user who is attempting to cause image 500 to be stored in the data source is in the plurality of users permitted to store images in which person 502 is present, the image management process determines that person 502 is not permitted to be present in the image.

Figure 6:
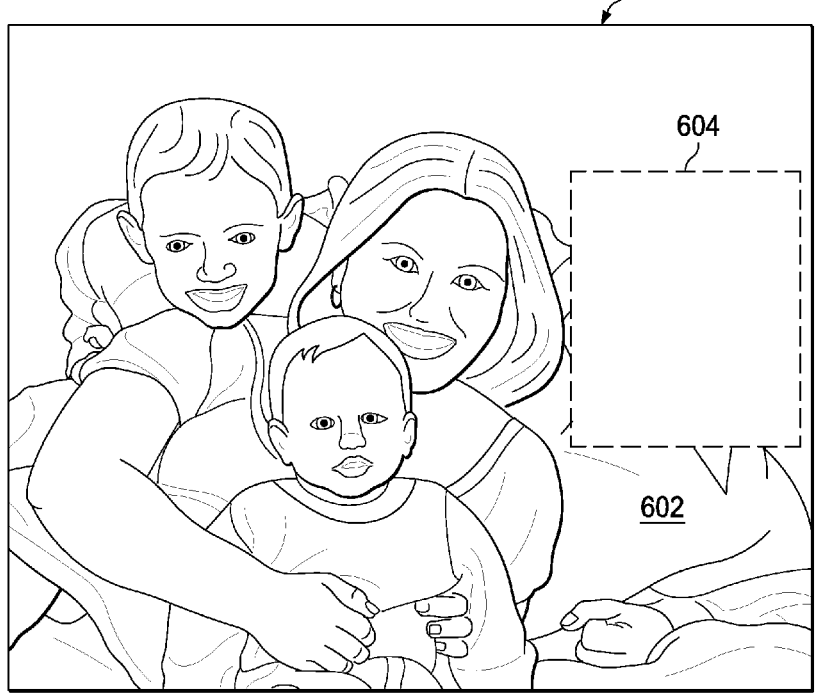
FIG. 6 depicts an illustration of an image in which a person was removed in accordance with an illustrative embodiment.

Referring now to FIG. 6, an illustration of an image in which a person was removed is depicted in accordance with an illustrative embodiment. Image 600 is an example of image 500 in FIG. 5 after being processed by an image management process, such as image management process 304 in FIG. 3.

In this illustrative example, the image management process determined that person 602 is not permitted to be present in image 600. Thus, the image management process has modified image 600 to include modification 604. Modification 604 is a change to image 600 that causes the identity of person 602 to be hidden. In this illustrative example, modification 604 is an opaque box overlaid on the face of person 602. Thus, the identity of person 602 is hidden because the face of person 602 is not viewable in image 600. Of course, in other illustrative embodiments, modification 604 may take another form. For example, modification 604 may be another shape, a graphic, a textual phrase of a particular size or another suitable modification.

Figure 7:
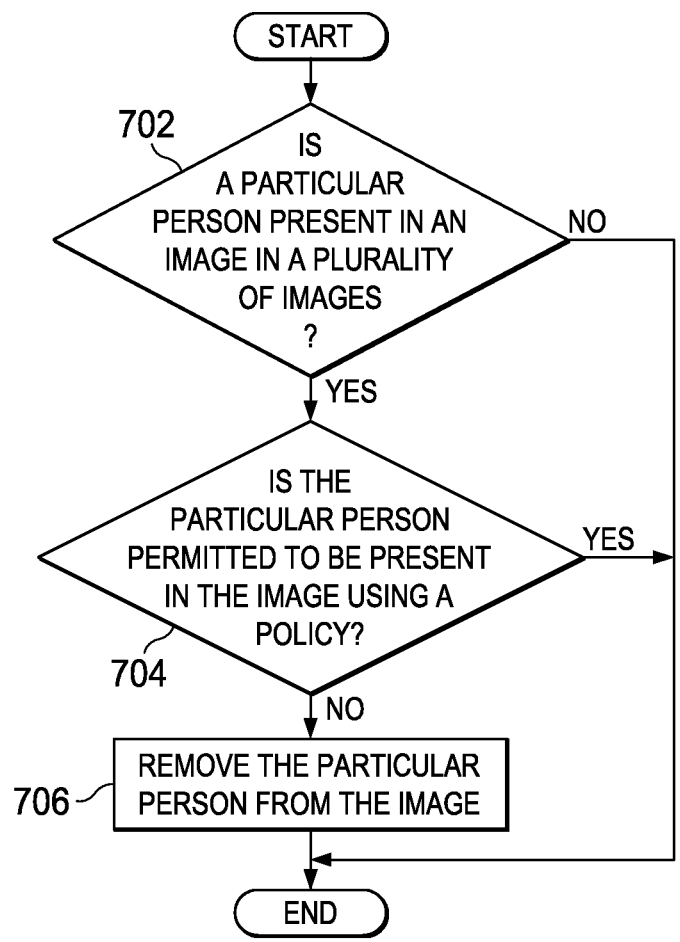
FIG. 7 depicts an illustration of a flowchart of a process for managing an image in accordance with an illustrative embodiment.

Turning now to FIG. 7, an illustration of a flowchart of a process for managing an image is depicted in accordance with an illustrative embodiment. The process may be performed by image management process 304 running in computer system 302 in FIG. 3.

The process begins by determining whether a particular person is present in an image in a plurality of images (step 702). The process may use facial recognition or another suitable algorithm to determine whether the person is present in the image. If the process determines that the person is not present in the image in the plurality of images, the process terminates. If the process determines that the person is present in the image in the plurality of images, the process then determines whether the particular person is permitted to be present in the image using a policy (step 704). The policy may indicate a plurality of users that are permitted to store images in which the person is present. The policy may also indicate a key or information to validate a digital signature that may be stored in the metadata associated with the image.

If the process determines that the particular person is permitted to be present in the image using the policy, the process terminates. If the process determines that the particular person is not permitted to be present in the image using the policy, the process removes the particular person from the image (step 706). The process may remove the particular person by modifying the image to hide the identity of the person. In one illustrative embodiment, the process blurs a portion of the object, such as the face or an identifying tattoo of a person. In other illustrative embodiments, the process inserts another object, such as an opaque box over the object. The process terminates thereafter.

Referring now to FIG. 8, an illustration of a second flowchart of a process for managing an image is depicted in accordance with an illustrative embodiment. The process may be performed by image management process 304 running in computer system 302 in FIG. 3.

The process begins by determining whether an object is present in a subset of a plurality of images using an identification of the object (step 802). The process may use facial recognition, trademark recognition, or another suitable algorithm to determine whether the object is present in the subset. If the process determines that the object is not present in the subset of the plurality of images using the identification of the object, the process terminates. If the process determines that the object is present in the subset of the plurality of images, the process then determines whether the object is permitted to be present in the subset of the plurality of images using a policy for a user associated with the object (step 804). The policy may indicate a plurality of users that are permitted to store images in which the object is present. The policy may also indicate a key or information to validate a digital signature that may be stored in the metadata associated with the image.

If the process determines that the object is permitted to be present in the subset of the plurality of images, the process terminates. If the process determines that the object is not permitted to be present in the subset of the plurality of images, the process performs a removal action of the object on the subset of the plurality of images (step 806). A removal action is an action that causes and/or leads to the individual no longer being present in the image. For example, the process may remove the object by modifying the image to obscure the object in the image. The removal action is an example implementation of removal action 344 in FIG. 3. The process terminates thereafter.

With reference now to FIG. 9, an illustration of a flowchart of a process for receiving an identification is depicted in accordance with an illustrative embodiment. The process may be performed by image management process 304 running in computer system 302 in FIG. 3.

The process begins by receiving a photo of the person and permissions for photos in which the person is present (step 902). The photo may contain the face of the user. The permissions may indicate which users of the computer system may store images in which the person is present. The permissions may also include a key that is to be included with images in which the person is present for the images to be approved. The process may perform step 902 as part of a registration element in which a user registers the face of the user with an image management process. In one illustrative example, the face in the photo is verified as the face of the user by an administrator. In another illustrative embodiment, the face of the user may be automatically verified by locating photos of the user in a database or Internet search. The photo of the person may also contain the face of another person. In such an illustrative embodiment, the permissions may further indicate that the second person is not permitted to appear in photos with the first person. In some illustrative examples, the permissions may also indicate that photos containing the first person and the second person may only be stored by particular users of the computer system or that a key is to be included with images in which the first and second person are present.

The process then identifies a numerical identity of the face of the person using characteristics of the face of the person (step 904). In one illustrative embodiment, the numerical identity is generated by identifying a collection of landmarks on a human face to generate a numerical code called a faceprint. For example, the collection of landmarks may include distance between the eyes, width of the nose, depth of the eye sockets, the shape of the cheekbones, and the length of the jaw line. In some illustrative embodiments, the process may be unable to identify the numerical identity of the face of the person because the characteristics of the person are not clear in the photo. In such an illustrative embodiment, the process may request additional photos from the user and use a combination of the characteristics of the face of the person in the photo and the additional photos to generate the numerical code.

The process then stores the identity of the face of the person and a policy for images in which the person is present (step 906). The policy is an example of policy 320 in FIG. 3. The process terminates thereafter.

Figure 10:
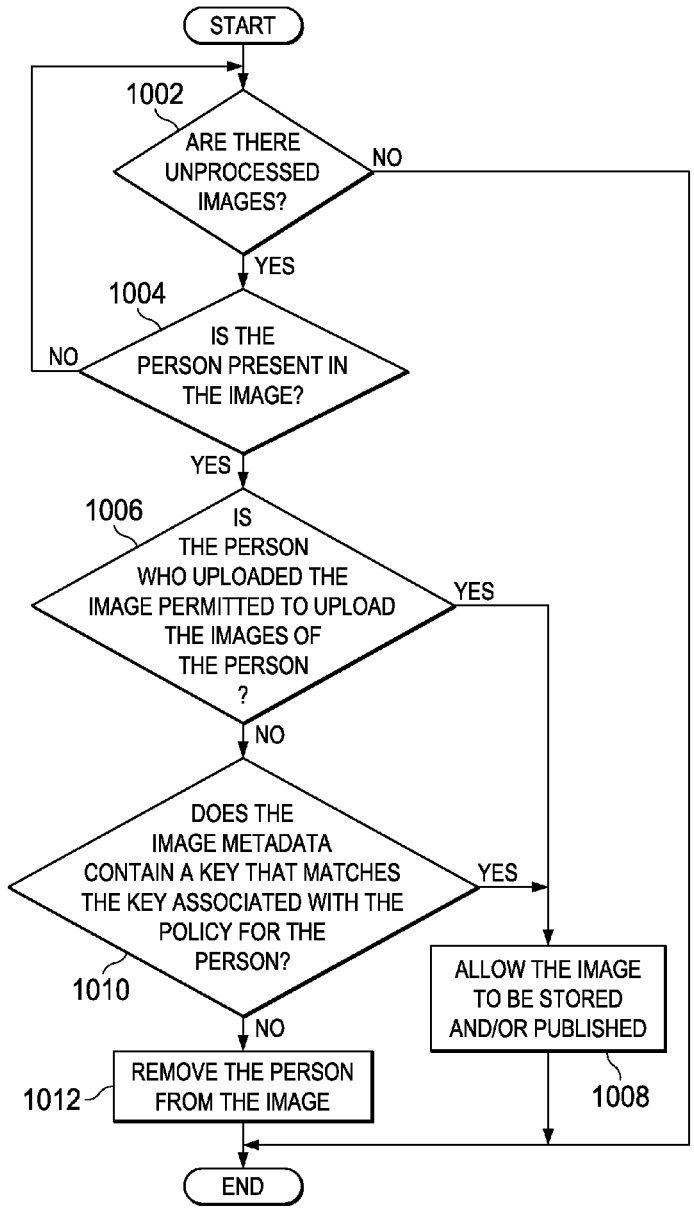
FIG. 10 depicts an illustration of a flowchart of a process for processing an image in accordance with an illustrative embodiment.

Turning now to FIG. 10, an illustration of a flowchart of a process for processing an image is depicted in accordance with an illustrative embodiment. The process may be performed by image management process 304 running in computer system 302 in FIG. 3.

The process begins by determining whether there are unprocessed images (step 1002). If the process determines there are no unprocessed images, the process terminates. If the process determines that there are unprocessed images, the process determines whether the person is present in the image (step 1004). The process may use facial recognition to determine whether the person is present in the image. If the process determines that the person is not present in the image, the process returns to step 1002.

If the process determines that the person is present in the image, the process determines whether the person who uploaded the image is permitted to upload images containing the person (step 1006). The process identifies the user attempting to store the image in a data source and/or make the image accessible on a website or in a social network. The process also identifies a plurality of users in a policy, such as policy 320 in FIG. 3, that are permitted to store and make images accessible in which the person is present.

If the process determines that the person who uploaded the image is permitted to upload images of the person, the process allows the image to be stored and/or published (step 1008). In an illustrative embodiment in which the images are to be made accessible on a website or social network, the process publishes the images to the website and/or social network by making the images accessible using the web and/or social network services.

If the process determines that the person who uploaded the image is not permitted to upload images of the person, the process determines whether the image metadata contains a key that matches the key associated with the policy for the person (step 1010). If the process determines that the image metadata contains a key that matches the key associated with the policy for the person, the process proceeds to step 1008. If the process determines that the image metadata does not contain a key that matches the key associated with the policy for the person, the process removes the person from the image (step 1012). The process may remove the person from the image by hiding the identity of the person, deleting the image, notifying an administrator of a website on which the image is published or another suitable action. The process terminates thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits or field programmable gate arrays that are manufactured or configured to perform one or more operations in the flowcharts or block diagrams.

In some alternative implementations, the function or functions noted in the block may occur out of the order noted in the figures. For example, in some cases, two blocks shown in succession may be processed substantially concurrently, or the blocks may sometimes be processed in the reverse order, depending upon the functionality involved. For example, encryption may be done concurrently or in an order different from the order depicted in the figures. Also, other blocks may be added in addition to the illustrated blocks in a flowchart or block diagram.

For example, in some illustrative embodiments, there may be additional operations between steps 1010 and 1012. In one illustrative embodiment, additional policies are stored in the policy for images in which the person is present. In such an illustrative embodiment, the process determines whether the policies are satisfied such that the person is permitted to be present in the image. For example, the policy may indicate that the person is only permitted to be present in images taken before or after a point in time or during a particular time period.

Thus, the different illustrative embodiments allow a user to prevent photos of the person from being published without the authorization of the user. Further, the user is not required to approve each user uploading images in which the user is present. Instead, the user may distribute a key to parties that are authorized to store or publish such images. In other illustrative embodiments, the user may prevent images from being stored or remove existing images from a data source when the user is present in the image with another person. For example, the user may desire to remove images containing the user and a former significant other.

The different illustrative embodiments also allow a user to receive a notification when photos of the person are published without the authorization of the user. For example, the different illustrative embodiments may identify photos of the user on the Internet that were stored and/or published by an unauthorized user. Further, the photos may be identified when the photos do not include a key distributed by the user to parties authorized to store and publish images of the user. When the user receives a notification, the user may request that the image be removed, initiate legal action, or other suitable actions.

Thus, the different illustrative embodiments provide a method, computer program product, and apparatus for managing an image. A determination is made whether an object is present in a subset of a plurality of images using an identification of the object. A determination is made whether the object is permitted to be present in the subset of the plurality of images using the policy for the user associated with the object responsive to a determination that the object is present in the subset of the plurality of images using a policy for a user associated with the object. A removal action of the object is performed on the subset of the plurality of images responsive to an absence of a determination that the object is permitted to be present in the subset of the plurality of images using the policy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing an image comprising:
   receiving a set of images at a social networking site;
   determining whether a particular person is present in a subset of the set of images using a facial recognition on the set of images;
   responsive to a determination that the particular person is present in the subset of the set of images, identifying a policy for the particular person;
   determining whether a second particular person is present in the subset of the set of images using the facial recognition on the set of images, wherein the policy indicates that the particular person is permitted to be present in the subset of the plurality of images with the second particular person;
   determining whether presence of the particular person in the subset of the set of images violates the policy; and
   responsive to a determination that the presence of the particular person in the subset of the set of images violates the policy, performing a removal action of the particular person on the subset of the set of images.

2. The method of claim 1, wherein the image is a first image and further comprising:
   receiving an identification of the particular person in a prior image and a set of desired permissions for the particular person; and
   generating the policy for use of the particular person in the set of images using the set of desired permissions.

3. The method of claim 1, wherein the step of determining whether the particular person is permitted to be present in the subset of the set of images violates the policy comprises:
   determining whether the subset of the set of images includes metadata comprising a first key matching a second key in the policy, wherein the second key indicates the particular person is permitted to be present in the image; and
   responsive to a determination that the subset of the set of images includes the metadata comprising the first key matching the second key in the policy, determining that the particular person is permitted to be present in the subset of the set of images.

4. The method of claim 1, wherein the step of determining whether the particular person is permitted to be present in the subset of the set of images using the policy comprises:
   determining whether the user that stored the subset of the set of images is permitted to store the subset of the set of images, wherein the policy comprises a plurality of users that are permitted to store the set of images in which the particular person is present.

5. The method of claim 1, wherein performing the removal action of the particular person on the subset of the set of images comprises:
   identifying an administrator of a website on which the subset of the set of images is located; and
   sending a notification to the administrator indicating that the subset of the set of images should be removed.

6. The method of claim 1, wherein the policy comprises a set of users that are permitted to publish imagery of the particular person.

7. The method of claim 6, wherein determining whether the particular person is permitted to be present in the subset of the set of images using the policy comprises:
   determining whether a publisher of the subset of the set of images is one of the set of users that are permitted to publish the imagery of the particular person.

8. The method of claim 1, wherein the policy comprises a key that indicates that the image is authorized by the particular person.

9. The method of claim 1 further comprising:
   responsive to the determination that the presence of the particular person in the subset of the set of images violates the policy, removing the set of images from a data source that stores the set of images.

10. The method of claim 1, wherein performing the removal action comprises:
    sending a notification to an individual selected from the particular person and a delegate of the particular person.

11. The method of claim 1, further comprising:
    determining whether a second particular person is present in the subset of the set of images; and
    wherein determining whether the particular person is permitted to be present in the subset of the set of images using the policy comprises determining whether the particular person and the second particular person are both permitted to be present in the subset of the set of images, and wherein the policy comprises a set of permissions for the subset of the set of images that contains the particular person.

12. The method of claim 1, wherein performing the removal action of the particular person on the subset of the set of images comprises:
    removing the particular person from the subset of the set of images.

13. A computer program product device for managing an image, the computer program product device comprising:
    a computer recordable storage medium;
    program instructions, stored on the computer recordable storage medium, for receiving a set of images at a social networking site;
    program instructions, stored on the computer recordable storage medium, for determining whether a particular person is present in a subset of the set of images using a facial recognition on the set of images;
    program instructions, stored on the computer recordable storage medium, for identifying a policy for the particular person responsive to a determination that the particular person is present in the subset of the set of images;
    program instructions, stored on the computer recordable storage medium, for determining whether a second particular person is present in the subset of the set of images using the facial recognition on the set of images, wherein the policy indicates that the particular person is permitted to be present in the subset of the plurality of images with the second particular person;
    program instructions, stored on the computer recordable storage medium, for determining whether presence of the particular person in the subset of the set of images violates the policy;
    program instructions, stored on the computer recordable storage medium, for performing a removal action of the particular person on the subset of the set of images responsive to a determination that the presence of the particular person in the subset of the set of images violates the policy.

14. The computer program product device of claim 13, wherein the program instructions are stored in a computer readable storage medium in a data processing system, and wherein the program instructions were downloaded over a network from a remote data processing system.

15. The computer program product device of claim 13, wherein the program instructions are stored in a computer readable storage medium in a server data processing system, and wherein the program instructions are downloaded over a network to a remote data processing system for use in a computer readable storage medium with the remote data processing system.

16. An apparatus comprising:
a bus system;
a storage device connected to the bus system, wherein the storage device includes program code; and
a processor unit connected to the bus system, wherein the processor unit processes the program code to receive a set of images at a social networking site; to determine whether a particular person is present in a subset of the set of images using a facial recognition on the set of images; responsive to a determination that the particular person is present in the subset of the set of images, identifying a policy for the particular person; to determine whether a second particular person is present in the subset of the set of images using the facial recognition on the set of images, wherein the policy indicates that the particular person is permitted to be present in the subset of the plurality of images with the second particular person; to determine whether presence of the particular person in the subset of the set of images violates the policy; and to perform a removal action of the particular person on the subset of the set of images responsive to a determination that the presence of the particular person in the subset of the set of images violates the policy.

\* \* \* \* \*